(12) United States Patent
Ferris et al.

(10) Patent No.: US 6,374,208 B1
(45) Date of Patent: Apr. 16, 2002

(54) SYSTEM AND METHOD FOR ADAPTING A PC-BASED APPLICATION TO AN AUTOMATED FORMAT

(76) Inventors: Robert D. Ferris, 1941 S. Brighton, Mesa, AZ (US) 85208; Roger D. Malin, 6010 W. Kings Ave., Phoenix, AZ (US) 85306

( * ) Notice: Subject to any disclaimer, the term of this patent is extended or adjusted under 35 U.S.C. 154(b) by 0 days.

(21) Appl. No.: 09/266,382

(22) Filed: Mar. 11, 1999

(51) Int. Cl.[7] .............................................. G06F 9/455
(52) U.S. Cl. ........................... 703/27; 703/25; 700/232
(58) Field of Search ...................... 703/24–27; 700/236, 700/232

(56) References Cited

U.S. PATENT DOCUMENTS

| | | | | |
|---|---|---|---|---|
| 4,562,304 A | 12/1985 | Ward | | 178/18 |
| 4,710,869 A | 12/1987 | Enokizono | | 364/200 |
| 4,894,522 A | 1/1990 | Elliott | | 235/472 |
| 5,034,598 A | 7/1991 | Poland | | 235/435 |
| 5,077,657 A | 12/1991 | Cooper | | 395/500 |
| 5,261,079 A | 11/1993 | Celi, Jr. | | 395/500 |
| 5,459,462 A | 10/1995 | Venkidu | | 341/326 |
| 5,590,315 A | 12/1996 | Hess | | 395/500 |
| 5,764,956 A | 6/1998 | Akahori | | 395/500 |
| 5,774,652 A | 6/1998 | Smith | | 395/186 |
| 6,126,548 A | * 10/2000 | Jacobs et al. | | 463/42 |
| 6,162,123 A | * 10/2000 | Woolston | | 463/37 |
| 6,164,973 A | * 12/2000 | Macri et al. | | 434/247 |

OTHER PUBLICATIONS

Public PC, "Public PC Hardware Requirements, Installation, Operation and Troubleshooting Guide", The National Amusement Network, Jul. 31, 1998, downloaded from the web at www.nani.org/nanispec/Cover%20and%20Introduction.html, downloaded Jan. 8, 2001).*

HAPP UGCI Specification and Features, Happ Controls, Dec. 1999, downloaded from the web at www.happcontrols.com, downloaded Jan. 8, 2001.*

Dentsch, Joseph, "The Open Arcade Architecture: It's almost here", Game Developer, p. 17–21, Spring 1998.*

Rahmat, Omid, "The Very Public Game Market", Game Developer, p. 3–10, Spring 1998.*

* cited by examiner

Primary Examiner—Russell W. Frejd
(74) Attorney, Agent, or Firm—Charlene R. Jacobsen; Lowell W. Gresham; Meschkow & Gresham P.L.C.

(57) ABSTRACT

In an arcade system (20), an interface circuit (38) is configured for communication with a PC (40) and one or more peripheral devices (59). The interface circuit (38) adapts a PC-based application (64), installed on and executable from the PC (40), to an automated format in order to include arcade-style features, such as video and audio cues, fee prompts, timing cues, and so forth. The interface circuit (38) includes a processor (66) in communication with a plurality of inputs and outputs on the interface circuit (38). A memory (68) is coupled to the processor (66) and includes a user-configurable control program (74) executable on the processor (66). The user-configurable control program (74) selectively translates the data received from the peripheral devices (59) to a data format that is recognized by the PC-based application (64) and selectively enables the transfer of the data from the peripheral devices (59) to the PC (40).

24 Claims, 8 Drawing Sheets

SYSTEM AND METHOD FOR ADAPTING A PC-BASED APPLICATION TO AN AUTOMATED FORMAT

TECHNICAL FIELD OF THE INVENTION

The present invention relates generally to arcades. More particularly, the present invention relates to adapting personal computer (PC) based applications to an automated format for use in arcades and unattended kiosks.

BACKGROUND OF THE INVENTION

Arcades are popular entertainment establishments containing games of a mechanical and electronic nature, such as pinball and video games, that may be played by customers for a fee. A typical video arcade game may include a housing having external user indicators and controls, a crediting device such as a coin box or card reader, a video monitor, and speakers for music and/or audible prompting. One or more printed circuit boards dedicated to a specific game are located inside the housing.

Video arcade games are periodically updated by the game manufacturers to add enhancements to the games such as improved display capabilities, faster exchange of information in networked arcade games, and new modes of play so as to keep the games interesting and challenging for the customers. In order to maintain current versions of the video arcade games in their arcades, arcade owners are obliged to purchase upgrade kits for their games.

These upgrade kits typically include at least one updated game dedicated circuit board that is to replace the game dedicated circuit board or boards currently residing in the arcade system. Unfortunately, these upgrade kits are costly since new game dedicated boards incur significant redevelopment costs. In addition, the arcade market is relatively small and the number of manufacturers of arcade games is limited. Accordingly, arcade vendors cannot receive the cost savings advantages that are inherent in a more competitive market in which there are many manufacturers employing mass production techniques.

Moreover, an updated game dedicated circuit board requires the arcade owner to open the housing of an arcade game and physically replace the older version of the circuit board. Alternatively, the arcade owner may hire an outside installer to replace the older version of a game with the newer version of the game. Either situation is undesirable from the perspective of hardware reliability since repeated handling of the internal mechanisms of the arcade game increases the likelihood of the arcade game being damaged. Furthermore, a hired installer may make the updating of games even more cost prohibitive for the owner of a small arcade.

In addition to the difficulties associated with updating the games, the small number of arcade game developers results in a limited number of arcade games from which an arcade owner may choose. By way of contrast, the variety of games that are produced for the ubiquitous personal computer (PC), i.e., the computer designed for individual use, is much greater. This is due to the highly competitive nature of the computer industry which is driven by the widespread presence of the PC and its associated applications in homes and businesses. In addition, PC applications are less expensive since they typically do not require game dedicated circuit boards and because they are produced for a mass market. For that same reason, PC applications are more readily updated, since only code changes are required rather than the manufacture of new circuit boards.

Unfortunately, PC games are not configured for the arcade environment. In other words, PC games do not operate in an automated format that incorporates arcade-style features. Such arcade-style feature include credit monitoring, fee prompts, audible cues, timing cues, interfacing capability with arcade controls and virtual reality devices, networking capabilities, and so forth. Moreover, it is undesirable for PC game developers to modify their existing game code to include such arcade-style features because development costs are prohibitive and the potential arcade market is low as compared to the PC-based application market.

SUMMARY OF THE INVENTION

Accordingly, an advantage of the present invention is that an interface circuit and method are provided in an arcade system for adapting a personal computer (PC) based application to an automated format.

Another advantage of the present invention is that the interface circuit adapts the PC-based application to an automated format without making changes to the existing PC-based application code.

Another advantage of the present invention is that the interface circuit and method adapt the PC-based application to an automated format to incorporate arcade-style features.

Another advantage of the present invention is that the interface circuit is selectively configurable for a variety of PC-based applications.

Yet another advantage of the present invention is that the system and method allow for networked arcade games including checking for credit.

The above and other advantages of the present invention are carried out in one form in an arcade system by an interface circuit for adapting a PC-based application to an automated format. The arcade system has a personal computer (PC), a peripheral device, and a display unit, and the PC-based application is installed on the PC and is executable from the PC. The interface circuit includes a communication port being configured for electrical communication with a serial port of the PC. A video input is configured for electrical communication with the PC for receiving a video signal of the PC-based application. A video output is configured for electrical communication with the display unit for providing the video signal of the PC-based application to the display unit. A data input is configured for electrical communication with the peripheral device for receiving data from the peripheral device. A data output is configured for electrical communication with the PC for providing the data to the PC. A processor is in communication with the video input, the video output, the data input, and the data output. A memory is coupled to the processor. The memory has stored therein a user-configurable control program executable on the processor. The control program includes a video control segment that selectively transfers the video signal from the PC to the display device, and a data control segment that selectively translates the data to a data format recognizable by said PC-based application.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
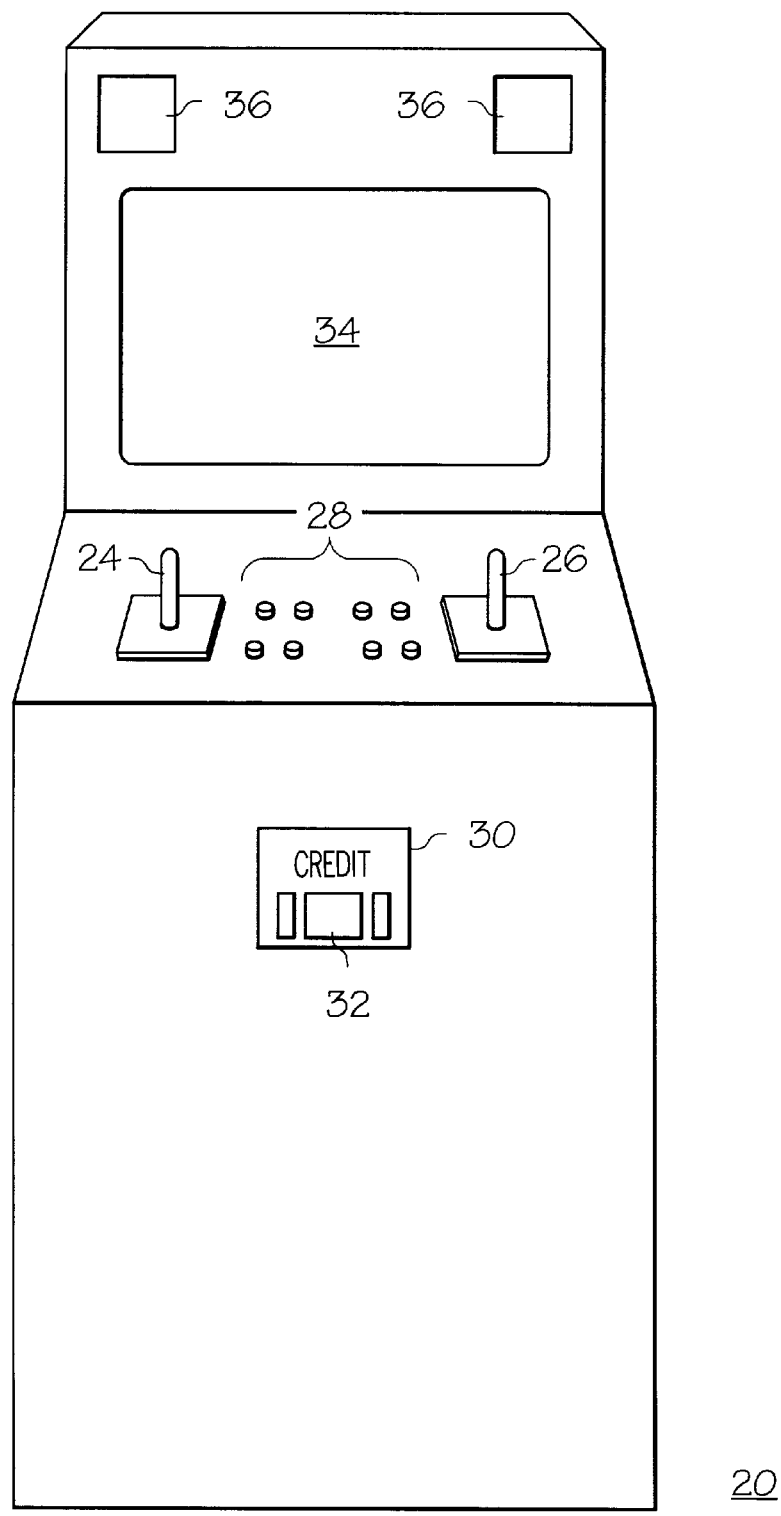
FIG. 1 shows an illustration of an arcade system.

FIG. 1 shows an illustration of an arcade system 20 into which the present invention may be incorporated. Arcade system 20 generally is a stand-alone unit which includes a housing 22 into which components specific to a particular game are -mounted. For example, arcade system 20 includes user-manipulated peripheral devices for inputting data into the arcade system in response to an arcade game being executed on arcade system. Such peripheral devices include a first joystick 24, a second joystick 26, user-activated buttons 28, and a trackball (not shown).

A crediting device 30, located in housing 22, is configured to accept a particular form of credit before arcade system 20 initiates a particular game. Crediting device 30 may be a coin box for receiving coins or tokens. Alternatively, crediting device 30 may accept bills or crediting device 30 may be a card reader device configured to receive credit to play a game by reading a user-provided card. Crediting device 20 also includes a credit display 32 for informing a user of the amount of credit that was paid into crediting device 30. Alternatively, crediting device 20 may include an audio output (not shown) for informing the user through audible messaging of the amount of credit that was paid into crediting device 30.

Arcade system 20 also includes a display unit, such as a monitor 34, for visually displaying the game and an audio output device, such as speakers 36, for providing an audible output of the game.

Those skilled in the art will recognize that arcade system 20 may take many different forms. For example, other arcade systems may include different peripheral devices such as steering wheels, foot operated controls, throttles, and so forth. In addition, other arcade systems may have display units which form a portion of virtual reality goggles or the display unit may be a screen onto which video is being projected. Similarly, the audio output device may be a headset worn by a user.

Figure 2:
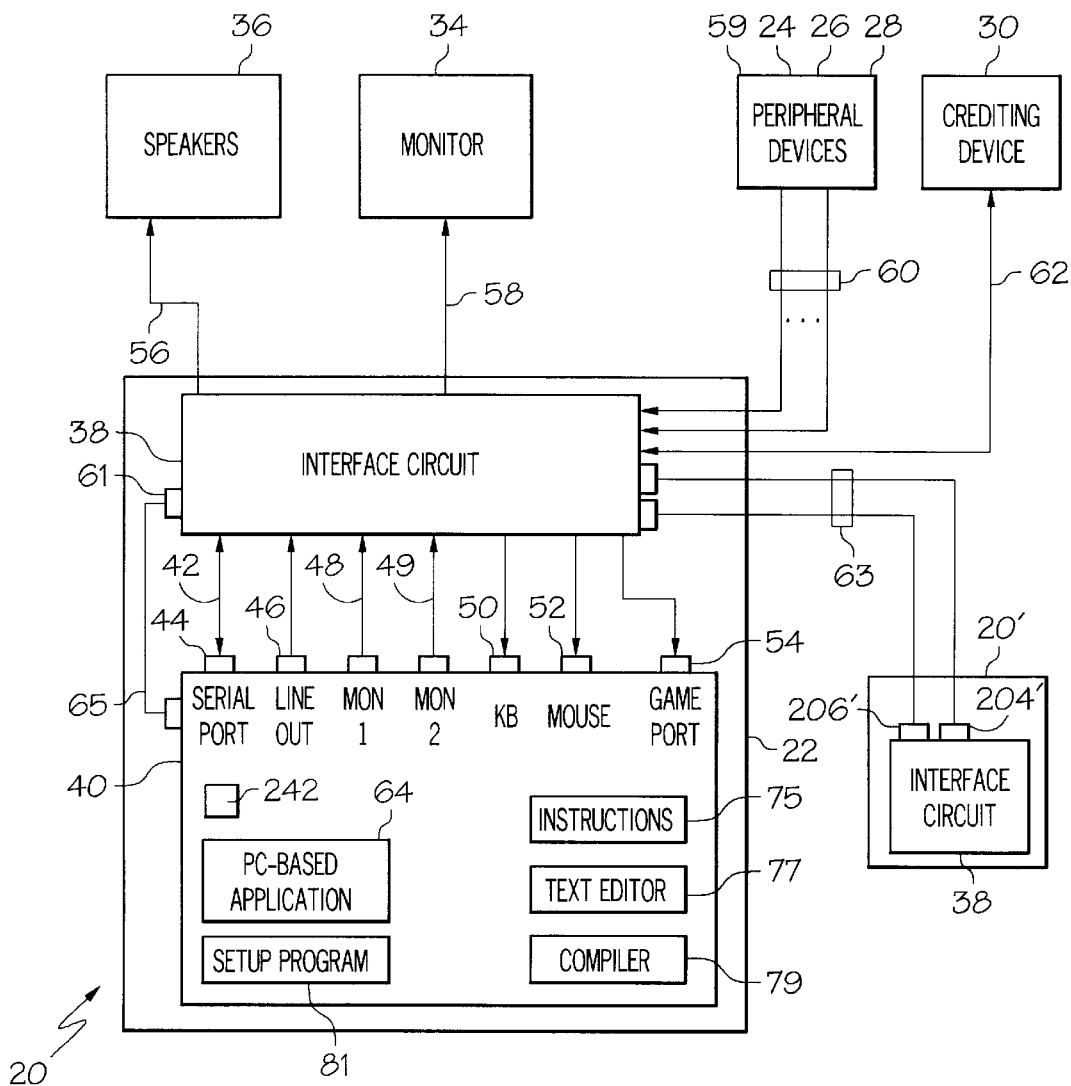
FIG. 2 shows a block diagram of an arcade system including an interface circuit.

FIG. 2 shows a block diagram of arcade system 20 into which an interface circuit 38 and a personal computer (PC) 40 have been incorporated. Interface circuit 38 is in electrical communication with PC 40 over a serial communication link 42 to a serial port 44 of PC 40. In addition, interface circuit 38 is configured for communication with PC 40 through a number of ports conventionally found on PC 40. For example, interface circuit 38 may couple to any of an audio line out port 46, a first monitor port (MON 1) 48, a second monitor port (MON 2) 49, a keyboard port (KB) 50, a mouse port (MOUSE) 52, and/or a game port 54 of PC 40. Likewise, interface circuit 38 is coupled to speakers 36 through an audio output link 56 and to monitor 34 through a video output link 58. Interface circuit 38 is also coupled to peripheral devices 59, such as first and second joysticks 24 and 26, and user-activated buttons 28 through appropriate links 60, and to crediting device 30 through a credit link 62.

Interface circuit 38 includes a power input 61. In a preferred embodiment, power is provided to interface circuit 38 from the PC power supply (not shown) resident in PC 40. Accordingly, a power link, represented by line 65, is formed between PC 40 and interface circuit 33. Of course, those skilled in the art will readily recognize that power may be provided to interface circuit 38 from a power source other than PC 40.

A network link 63 couples arcade system 20 to a second arcade system 20' in which a interface circuit 38' is located. Arcades typically includes multiplayer, interactive games. For example, a game may have multiple players racing one another on a common "virtual track" as shown on a monitor. Such a game requires several individual arcade systems to be networked so that the signals representing each of the players may interact with one another. The networking function of interface circuit 38 and network link 63 allows networked play, and will be described in more detail below.

Conventionally, arcade systems include at least one game dedicated circuit board configured to execute a specific arcade application. In the preferred embodiment, arcade system 20 does not have a game dedicated circuit board for executing a specific arcade application. Rather, interface circuit 38 functions to adapt a PC-based application 64 stored in a memory element of PC 40 to an automated format to incorporate arcade-style features. In other words, PC 40 is a conventional personal computer and interface circuit 38 operates to incorporate arcade-style features such as credit monitoring, fee prompts, audible cues, timing cues, interfacing capability with arcade controls and virtual reality devices, networking capabilities, and so forth. The interconnections to and from interface circuit 38 are user-configurable and depend upon the connections needed to adapt PC-based application 64 an automated format, details of which will be described below.

In the preferred embodiment, PC-based application 64 is a PC game developed by a third party developer and designed to be played on a conventional personal computer. However, nothing in the present invention limits PC-based application 64 to PC games. Rather, PC-based application 64 may be educational software, custom software developed for presentation of corporate information at trade-shows, internet browsers, and the like, developed for execution by PC 40.

Figure 3:
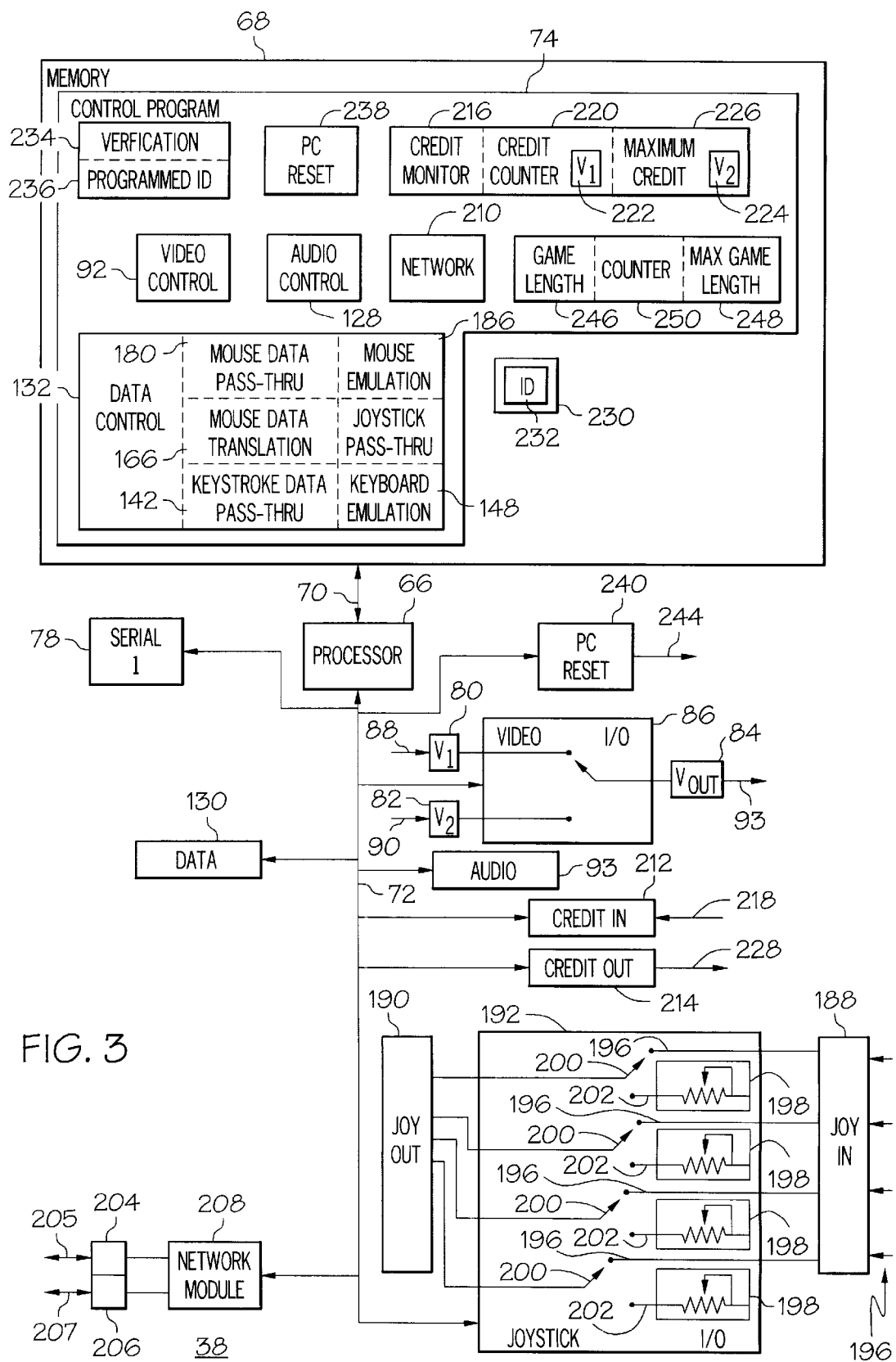
FIG. 3 shows a block diagram of the interface circuit.

FIG. 3 shows a block diagram of interface circuit 38. Interface circuit 38 includes a processor 66 and a memory 68 coupled to processor 66 through a communication bus 70. Processor 66 is in communication with a number of functional elements (discussed below) on interface circuit 38 through a control bus 72. A user-configurable control program 74 is stored in memory 68. Control program 74 is a compilation of a number of instructions that adapt PC-based application 64 (FIG. 2) to an automated format.

Referring to FIG. 2, control program 74 is assembled on PC 40 (or a separate development PC). Control program 74 is assembled by selecting a subset of instructions from a set of instructions 75. Instructions 75 are in a human understandable language but are interpretable by processor 66 for carrying out specific functions. Once a subset of instructions 75 are assembled through a text editor 77 on PC 40 (or on a separate development PC), the subset of instructions are compiled by a compiler 79 which converts the instructions into machine code, i.e., control program 74, which is read and can be acted upon by processor 66. Once compiled, control program 74 is then downloaded into memory 68.

PC 40 also has resident in it's memory a setup program 81 developed to communicate with control program 74. Setup program 81 includes user prompts that allow the developer of control program 74 and the arcade vendor to set and adjust variables in control program 74. Such variables include for example, the amount of credit needed to play PC-based application 64 or to continue playing PC-based application, a maximum credit setting, game length, game difficulty levels, game volume, and so forth. Setup program 81 may be invoked following download of control program 74 into memory 68. Additionally, setup program 81 may be invoked once arcade system 20 is installed in an arcade. Of course, those skilled in the art will recognize that setup program 81 may be password controlled so that certain variables may be changed only by those authorized to do so.

Processor 66 accesses control program 74 and executes the subset of instructions to control the function of each of the functional elements. The functional elements and their control by control program 74 are described as follows.

Referring back to FIG. 3, control bus 72 operationally couples processor 66 to a serial communication port (SERIAL 1) 78. Serial communication port 78, in turn, is configured for electrical communication with serial port 44 (FIG. 2) of PC 40 through serial communication link 42 (FIG. 2). Serial communication link 42 allows bidirectional communication between interface circuit 38 and PC 40. Such communication includes downloading of control program 74 into memory 68 as well as handshaking functions between interface circuit 38 and PC 40 in order to invoke PC-based application 64 (FIG. 2).

Instructions 75 (FIG. 2) include commands for controlling serial communication port 78. In particular, these commands enable port 78 for communication with serial port 44 (FIG. 2). By way of example, these commands include:

| | |
|---|---|
| SERIAL_PORT1_INIT | ;append instruction with serial port setup information |
| SERIAL_PORT1_OUT | ;output test string from port 1 |
| SERIAL_PORT1_CHR | ;output binary string from port 1 |
| Example: | |
| SERIAL_PORT1_INIT9600,8,N,1 | ; initializes serial communication port 78 to 9600 baud, 8-bit, no parity, and 1 stop |

Video Control

Interface circuit 38 includes a first video input ($V_1$) 80, a second video input ($V_2$) 82, a video output ($V_{out}$) 84, and video input/output (I/O) functional element 86 coupled therebetween. In a preferred embodiment, first video input 80 is in communication with first monitor port 48 (FIG. 2) and receives a first video signal 88 of PC-based application 64 (FIG. 2) from a video board (not shown) resident in PC 40. PC 40 is configured with a second video board (not shown). Second video input 82 is in communication with second monitor port 49 for receipt of a second video signal 90 from the second video board.

Video I/O functional element 86 is controlled by processor 66 through control bus 72. Processor 66 executes a video control segment 92 of control program 74. Video control segment 92 selects one of first and second video signals 88 and 90 for output through video output 84 to monitor 34 (FIG. 2). First and second video inputs 80 and 82 are conventional variable graphics array (VGA) connectors and first and second video signals 88 and 90 are VGA signals.

In another embodiment of the present invention, first and second video inputs 80 and 82 are national television standards committee (NTSC) connectors and first and second video signals 88 and 90 are NTSC signals. In a preferred embodiment of the present invention, interface circuit 38 includes two VGA input connectors and two NTSC input connectors so that either VGA signals or NTSC signals may be received.

In any instance, a single selected video output signal 93 is provided by video output 84. Accordingly, video I/O functional element 86, as commanded by video control segment 92, selectively transfers first video signal 88 of PC-based application 64 (FIG. 2) or second video signal 90. Video I/O functional element 86 is useful in a situation where first video signal 88 of PC-based application 64 is a set-up type menu as opposed to the actual game. This set-up menu is thus hidden by providing second video signal 90 to video output 84 and subsequently to monitor 34 (FIG. 2).

Instructions 75 that are used to form video control segment 92 of control program 74 and control selection of first and second video signals 88 and 90 are as follows:

GAME_VIDEO ;select first video input 80 to video output 84

LASER_VIDEO ;select second video input 82 to video output 84

Audio Control

Figure 4:
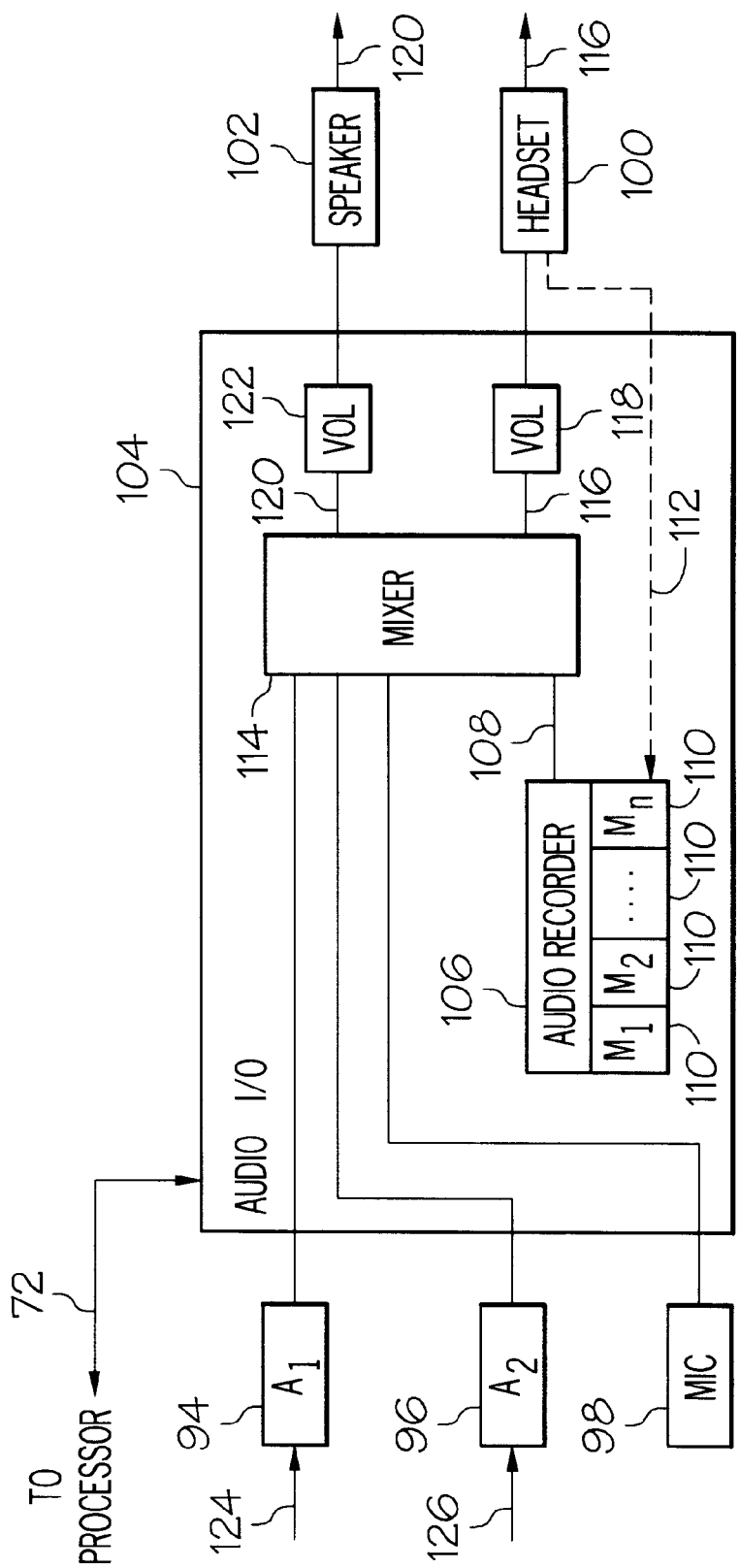
FIG. 4 shows a block diagram of an audio portion of the interface circuit.

Referring to FIGS. 3 and 4, interface circuit 38 includes an audio portion (AUDIO) 93. FIG. 4 shows a block diagram of audio portion 93. Audio portion 93 includes a first audio input ($A_1$) 94, a second audio input ($A_2$) 96, a microphone input (MIC) 98, a first audio output (HEADSET) 100, a second audio output (SPEAKER) 102, and an audio input/output (I/O) functional element 104 coupled therebetween.

Audio I/O functional element 104 includes an audio recorder integrated circuit (IC) 106 having a recorder output 108. A plurality of audio messages 110 are recorded onto audio recorder IC 106 during a recording session prior to execution of control program 74. An audio signal 112 coming from first audio output 100 is recorded onto audio recorder IC 106. Audio messages 110 originate from any of first and second audio inputs 94 and 96, and microphone input 98. Audio messages 110 are those types of messages typically found in arcade games. For example, the audio messages may include prompts for additional credit, timing prompts, game over prompts, and so forth.

Each of first and second audio inputs 94 and 96, respectively, microphone input 98, and audio recorder output 108 are coupled to an audio mixer circuit (MIXER) 114. Audio mixer circuit 114 provides a first output signal 116 for communication to first audio output 100 through a first volume control circuit 118. Likewise, audio mixer circuit 114 provides a second output signal 120 for communication to second audio output 102 through a second volume control circuit 122.

In the preferred embodiment, first audio input 94 is configured to receive a first audio signal 124 of PC-based application 64 which is output from a sound card (not shown) resident in PC 40 (FIG. 2) through audio line output 46 (FIG. 2) of PC 40. Second audio input 96 is configured to receive a second audio signal 126 which is output from an external device such as a laser disc player (not shown). First output signal 116 is a headset compatible drive output signal and first audio output 100 is a connector configured for connection with a user-worn headset (not shown). Second output signal 120 is an amplifier compatible drive output signal and second audio output is a connector configured for communication with speakers 36 (FIG. 2) via audio output link 56 (FIG. 2).

Audio I/O functional element 104 is controlled by processor 66 through control bus 72. Processor 66 executes an audio control segment 128 of control program 74. Audio control segment 128 provides control of first and second output signals 116 and 120 from mixer circuit 114. Instructions 75 (FIG. 2) that are used to form audio control segment 128 of control program 74 are as follows:

| Audio Functions | |
|---|---|
| MIC_ON | ;turn mic input on, enables output of first and second output signals 116 and 120 at first and second audio outputs 100 and 102 |
| MIC_OFF | ;turn mic input off |
| MIC_VOLUME | ;set volume level of mic when on. |
| Example: | |
| LET MIC_VOLUME=38 | ;mic volume set to mid-range |
| MIC_ON | ;turn on mic |
| GAME_AUDIO_ON | ;enable input of first audio signal 124, enables output of first and second output signals 116 and 120 at first and second audio outputs 100 and 102 with first audio signal 124 |
| GAME_AUDIO_OFF | ;disable input of first audio signal 124 |
| GAME_VOLUME | ;set volume of first audio signal 124 |
| Example: | |
| LET GAME_VOLUME=38 | ;game volume set to mid-range |
| GAME_AUDIO_ON | ;enable input of first audio signal 124 |
| LASER_AUDIO_ON | ;enable input of second audio signal 126, enables output of first and second output signals 116 and 120 at first and second audio outputs 100 and 102 with second audio signal 126 |
| LASER_AUDIO_OFF | ;disable input of second audio signal 126 |
| LASER_VOLUME | ;set volume of second audio signal 126 |
| MESSAGE_ON | ;enable recorder output 108, enables output of first and second output signals 116 and 120 at first and second audio outputs 100 and 102 with pre-recorded audio messages 110 |
| MESSAGE_OFF | ;disable output of pre-recorded audio messages 110 |
| MESSAGE_VOLUME | ;set volume level of pre-recorded audio messages 110 |
| PLAY_MESSAGE_HIGH | ;play specified message, high priority |
| PLAY_MESSAGE_MED | ;play specified message, medium priority |
| PLAY_MESSAGE_LOW | ;play specified message, low priority |
| RECORD_MESSAGE | ;record message |
| STOP_RECORD | ;stop record function |
| SET_TO_DEFAULT | ;set all audio levels to predetermined values |

Data Control

Figure 5:
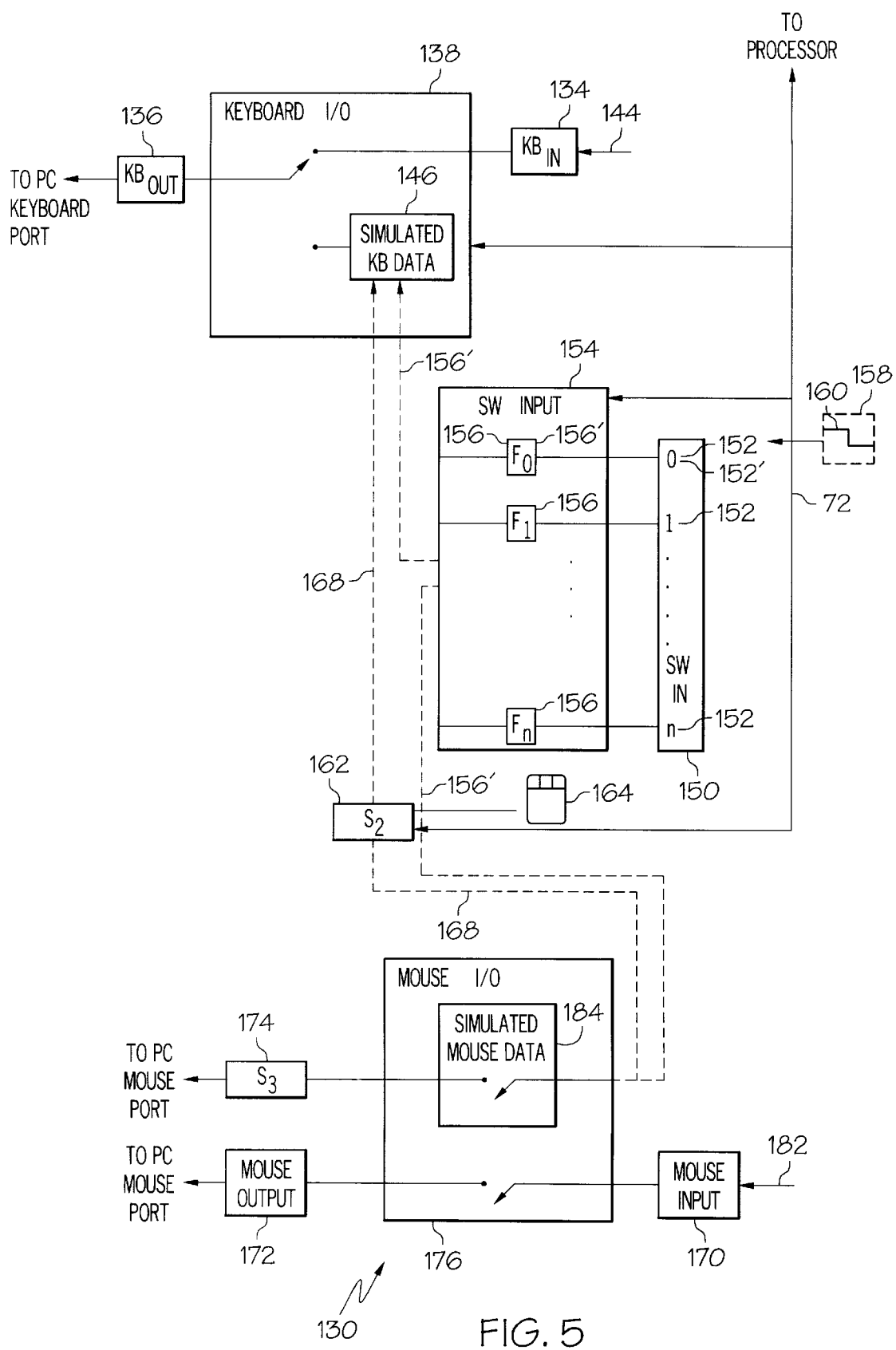
FIG. 5 shows a block diagram of a data portion of the interface circuit.

Referring now to FIGS. 3 and 5, interface circuit 38 includes a data portion (DATA) 130. FIG. 5 shows a block diagram of data portion 130. Data portion 130 is controllable by processor 66 over control bus 72. Data portion 130 has numerous functions and is user-configurable for adapting PC-based application 64 to arcade-style function.

Typically, arcade game dedicated circuit boards connect to peripheral devices 59 through an arcade industry standard double-sided, twenty-eight pin connector. In addition, peripheral devices 59 in a conventional arcade game typically output switch signals. In other words, the signals are either high or low.

However, PC-based games, such as PC-based application 64, are configured to recognize data signals from data ports that are conventionally available on PC 40, such as keyboard port 50 (FIG. 2) and mouse port 52 (FIG. 2). Accordingly, data portion 130 of interface selectively translates signals from peripheral devices 59 into a format recognizable by PC-based application 64, for example into keystroke data or mouse movement data. Data portion 130 is controlled by a data control segment 132 of control program 74. Data control segment 132 has a plurality of subsections of instructions that relate to the various functional elements of data portion 130.

Data portion 130 includes a keyboard input ($KB_{in}$) 134, a keyboard output ($KB_{out}$) 136, and a keyboard input/output (I/O) functional element 138 coupled therebetween. Keyboard input 134 is provided for connection to a conventional PC keyboard (not shown) or to other peripheral data output devices that conventionally couple to keyboard port 50 (FIG. 2) of PC 40 (FIG. 2). Keyboard output 136 is configured for connection with keyboard port 50 of PC 40. Keyboard I/O element 138 is controlled by processor 66 through control bus 72. Processor 66 executes a keystroke pass-through subsection 142 of data control segment 132 that enables the transfer of keystroke data 144 (i.e. the data produced by striking keys on a PC keyboard) received at keyboard input 134 to keyboard output 136. Instructions 75 (FIG. 2) that are used to form keystroke pass-through subsection 142 are as follows:

Keyboard Enable
KEYBOARD_ON ;enables transfer of keystroke data 144 from keyboard input 134 to keyboard output 136
KEYBOARD_OFF ;disables transfer of keystroke data 144

Alternatively, keyboard I/O element 138 is also controlled by processor 66 to provide simulated keystroke data 146 to keyboard output 136 in response to a keyboard emulation subsection 148 of data control section 132. Keyboard emulation subsection 148 is invoked when the peripheral devices, such as first and second joysticks 24 and 26, respectively, or user-activated buttons 28 (FIG. 1) produce switch input signals, but PC-based application 64 (FIG. 2) is configured to recognize keystroke data.

Accordingly, data portion 130 of interface circuit 38 includes a switch input connector ($SW_{in}$) 150. In the preferred embodiment, switch input connector 150 is a twenty-five pin connector that provides connections for up to nineteen switch inputs 152. A switch input functional element 154 is controlled by processor 66 to manage a plurality of flags, or variables, 156. One each of flags 156 corresponds to one each of switch inputs 152. Accordingly, when peripheral devices 59 (FIG. 2) produce switch signals, i.e., a switch 158 closes, a switch input signal 160 is received by the associated one of switch inputs 152, for example a switch input 152'. In response data control segment 132 of control program sets the associated one of flags 156, for example flag 156'.

In response to the setting of flag 156', keyboard emulation subsection 148 of control program 132 allows the translation of flag 156' set in response to switch input signal 160 into simulated keystroke data 146 that is recognizable by PC-based application 64.

Instructions 75 (FIG. 2) that are used to form keyboard emulation subsection 148 are as follows:

| Keyboard Emulation | |
|---|---|
| KEYBOARD_HOLD | Simulates a key that is held down to allow multikey operation |
| KEYBOARD_RELEASE | Append a single character that is to be released |
| KEYBOARD_HOLD_TIME | ;Set the key press time in 10 msec increments, 1 = 10 msec, 255 = 2.55 sec |

-continued

| Keyboard Emulation | |
|---|---|
| KEYBOARD | ;Append a string of characters to be output, 128 char max. |
| KEYBOARD_CHAR_TIME | ;Set the delay time between key presses in 10 msec increments, 1 = 10 msec, 255 = 2.55 sec |
| KEYBOARD_CHAR | ;Output special characters (i.e. F1–F12, Pause, etc.) |
| Examples: | |
| LET KEYBOARD_HOLD_TIME=20 | ;Initialize key hold down time to 200 msec |
| LET_KEYBOARD_CHAR_TIME=50 | ;Initialize delay to next character to 500 msec |
| KEYBOARD "12345" | ;PC sees 12345 |
| KEYBOARD HOLD + | ;Hold down shift key |
| KEYBOARD "12345" | ;PC sees !@#$% |
| KEYBOARD_RELEASE + | ;Release shift key |
| KEYBOARD_CHAR "F1" | ;PC sees F1 key press |

Although keyboard emulation subsection 148 was described in connection with switch inputs 152, data portion 130 also includes a serial input port (S$_2$) 162. Serial input port 162 is a conventional nine pin serial connector configured for connection to a peripheral device 59 (FIG. 2) of arcade system 20, such as a mouse 164. When mouse 164 is connected to serial input port 162, a mouse data translation subsection 166 of data control segment 132 is invoked to allow translation of mouse movement data 168 received at serial input port 162 into a data format recognizable by PC-based application 64 (FIG. 2).

For example, mouse data translation subsection 166 is invoked in combination with keyboard emulation subsection 148 to translate mouse movement data 168 into simulated keystroke data 146. Simulated keystroke data 146 is subsequently output at keyboard output 136 for receipt at keyboard input port 50 (FIG. 2) of PC 40 (FIG. 2). Instructions 75 (FIG. 2) that are used to form mouse data translation subsection 166 are as follows:

| Mouse Translation | |
|---|---|
| INIT_MOUSE | ;Initialize mouse movement accumulators |
| MOUSE_TRANS_ON | ;Initialize interface circuit 38 for mouse translation via serial input port 162 |
| MOUSE_TRANS_OFF | ;Disable mouse translation |
| MOUSE_SENSITIVITY | ;Set sensitivity of mouse movement count to flag set, 1–127 |
| MOUSE_X_POS | ;Positive X flag—set if mouse movement > sensitivity |
| MOUSE_X_NEG | ;Negative X flag—set if mouse movement > sensitivity |
| MOUSE_Y_POS | ;Positive Y flag—set if mouse movement > sensitivity |
| MOUSE_Y_NEG | ;Negative Y flag—set if mouse movement > sensitivity |
| CLR_MOUSE_X_POS | ;Clear positive X flag |
| CLR_MOUSE_X_NEG | ;Clear negative X flag |
| CLR_MOUSE_Y_POS | ;Clear positive Y flag |
| CLR_MOUSE_Y_NEG | ;Clear negative Y flag |

Example of Mouse Translation:

MOUSE_TRANS_ON
INIT_MOUSE
LET MOUSE_SENSITIVITY = 50
IF MOUSE_X_NEG = TRUE GOTO OutL   ;Test for mouse neg X, jump if > 50

-continued

| Mouse Translation | |
|---|---|
| IF MOUSE_X_POS = TRUE GOTO OutR | ;Test for mouse pos X, jump if > 50 |
| IF MOUSE_Y_NEG = TRUE GOTO OutD | ;Test for mouse neg Y, jump if > 50 |
| IF MOUSE_Y_POS = TRUE GOTO OutU | ;Test for mouse pos Y, jump if > 50 |

Example of keyboard emulation in combination with mouse translation:

| | | |
|---|---|---|
| OutL: | KEYBOARD "L" | ;Output keyboard character "L" |
| | CLR_MOUSE_X_NEG | ;Clear negative X flag |
| OutR: | KEYBOARD "R7" | ;Output keyboard character "R" |
| | CLR_MOUSE_X_POS | ;Clear positive X flag |
| OutD: | KEYBOARD "D" | ;Output keyboard character "D" |
| | CLR_MOUSE_Y_NEG | ;Clear negative Y flag |
| OutU: | KEYBOARD "U" | ;Output keyboard character "U" |
| | CLR_MOUSE_Y_POS | ;Clear positive Y flag |

Although data portion 130 has been discussed in connection with keyboard inputs and outputs, data portion 130 also includes a mouse input 170, a mouse output 172, a serial output (S$_3$) 174, and a mouse input/output (I/O) functional element 176. Mouse input 170 is provided for connection to a conventional PC mouse, such as mouse 164 or to other peripheral devices 59 that conventionally couple to mouse port 52 (FIG. 2) of PC 40 (FIG. 2). Mouse output 172 is configured for connection with mouse port 52 of PC 40. Mouse I/O element 176 is controlled by processor 66 through control bus 72. Processor 66 executes a mouse data pass-through subsection 180 of data control segment 132 that enables the transfer of mouse movement data 182 received at mouse input 170 to mouse output 172. Instructions 75 (FIG. 2) that are used to form mouse data pass-through subsection 180 are as follows:

Mouse Control
MOUSE_ENABLE ;Enable mouse input 170 to mouse output 172
MOUSE_DISABLE ;Disable mouse input 170 to mouse output 172

Alternatively, mouse I/O element 176 is also controlled by processor 66 to provide simulated mouse data 184 to serial output 174 in response to a mouse emulation subsection 186 of data control section 132. Serial output 174 is configured for connection with mouse port 52 (FIG. 2) of PC 40 (FIG. 2).

Mouse emulation subsection 186 is invoked when the peripheral devices, such as first and second joysticks 24 and 26, respectively, or user-activated buttons 28 (FIG. 1) produce switch input signals, such as switch input signal 160 (discussed previously), and PC-based application 64 (FIG. 2) is configured to recognize mouse movement data. Alternatively, mouse data translation subsection 166 may be invoked in combination with mouse emulation subsection 186 to process data received at serial input 162 to produce simulated mouse data 184 for output at serial output 174. Instructions 75 (FIG. 2) that are used to form mouse emulation subsection 186 are as follows:

| Mouse Emulation | |
|---|---|
| MOUSE_ON | ;Initialize interface circuit 38 for mouse emulation via serial output 174 |
| MOUSE_OFF | ;Mouse emulation off |
| MOUSE_LEFT | ;Simulate left mouse press |

-continued

| Mouse Emulation | |
|---|---|
| MOUSE_RIGHT | ;Simulate right mouse press |
| MOUSE_RELEASE | ;Release mouse press (either key) |
| MOUSE | ;Simulate mouse movement, number of pulses in X and Y direction |
| Example: | |
| MOUSE_ON | |
| MOUSE_LEFT | ;enable drag operation |
| MOUSE 100,-55 | ;Simulate mouse movement, 100 pulses right, 55 pulses up, drag operation because left button is active |
| MOUSE_RELEASE | ;release mouse press, disable drag |

Joystick Control

Referring back to FIG. 3, interface circuit 38 includes a joystick input (JOY$_{in}$) 188, a joystick output (JOY$_{out}$) 190, and a joystick I/O functional element 192 coupled therebetween. Joystick input 188 is configured for connection with a conventional PC joystick (not shown) or other peripheral device that would typically be connected to game port 54 (FIG. 2) of PC 40 (FIG. 2). Joystick output 190 is configured for connection with game port 54 of PC 40.

Joystick I/O functional element 192 is controlled by processor 66 via control bus 72. Processor 66 executes a joystick pass-through subsection 194 of data control segment 132 to allow the transfer of joystick signals 196 received at joystick input 188 to joystick output 190 for subsequent receipt at game port 54 of PC 40.

In the preferred embodiment joystick input 188 is configured to receive up to four joystick signals 196. This corresponds to two PC joysticks (not shown) each of which outputs a left/right signal and an up/down signal. Accordingly, joystick output 190 is configured to receive the four joystick signals 196 for subsequent receipt at game port 54. Four joystick signals 196 are present when PC-based application 64 (FIG. 2) is a two player game in which the signals recognizable by PC-based application are joystick signals 196 being received from two joysticks, each of the two players using one of the two joysticks.

Joystick I/O functional element 192 also includes potentiometer circuits 198 and switching elements 200. One each of potentiometer circuits 198 and switching elements 200 is associated with one each of joystick output signals 196. Each of potentiometer circuits 198 are configured to provide a predetermined signal 202 according to a pre-set position of the potentiometer circuit 198.

When joystick pass-through subsection 194 of data control segment 132 disables the output of joystick signals 196 to joystick output 190, switching elements 200 are switched so that joystick output 190 receives predetermined signals 202. Predetermined signals 202 supersede joystick signals 196 so that PC-based application 64 (FIG. 2) presumes that the PC joysticks (not shown) are not being manipulated. This function is desirable for preventing PC 40 from receiving joystick signals 196 until, for example, the initiation of PC-based application 64. Instructions 75 (FIG. 2) that can be used to form joystick pass-through subsection 194 include:

| Joystick Control: | |
|---|---|
| JOYSTICK_ON | ;enable pass-through of joystick signals 196 from joystick input 188 to joystick output 190 |
| JOYSTICK_OFF | ;disable pass-through of joystick signals 196, enable transfer of predetermined signals 202 to joystick output 190 |

Network Control

Interface circuit 38 also includes a first network signal link 204, a second network signal link 206, and a network functional module 208 in communication with each of first and second network signal links 204 and 206, respectively. First and second network signal links 204 and 206 are configured for connection with second interface circuit 38' (FIG. 2) of second arcade system 20' (FIG. 2) via network link 63 (FIG. 2). First and second network signal links 204 and 206 are configured for the communication of first and second bi-directional signals 205 and 207, respectively, to and from interface circuit 38 and second interface circuit 38'.

Network functional module 208 is controlled by processor 66 via control bus 72. Processor 66 executes a network segment 210 of control program 74 that sets first and second bi-directional signals 205 and 207 in order to allow networked play between arcade system 20 (FIG. 2) and arcade system 20' (FIG. 2). Network segment 210 sets first and second bi-directional signals 205 and 207 to allow synchronization of games between each of arcade systems 20 and 20'. First and second signal links 204 and 206 are coupled to first and second signals links 204' and 206', respectively, (see FIG. 2) of network link 63 (FIG. 2).

When a sufficient credit payment is ascertained by control program 74 and networked PC-based application 64 (FIG. 2) is initiated, network segment 210 of control program 74 flags interface circuit 38' for the start of a network game and interface circuit 38' responds over network link 63 (FIG. 2) to proceed with the network application. Instructions 75 (FIG. 2) that may be used to form network segment 210 include the following:

| Network Control | |
|---|---|
| SET_NETWORK_1 | ;Drive network line #1 to active state |
| SET_NETWORK_2 | ;Drive network line #2 to active state |
| CLR_NETWORK_1 | ;Set network line #1 to inactive state |
| CIR_NETWORK_2 | ;Set network line #2 to inactive state |
| NETWORK_1 | ;Variable indicating state of network line #1 |
| NETWORK_2 | ;Variable indicating state of network line #2 |
| Example: | |
| SET_NETWORK_1 | ;Drive network line #1 to active state |
| IF NETWORK_2=TRUE GOTO NEXT_TEST | ;Test Network line #2 for active state, jump if so |
| CLR_NETWORK_1 | ;Set network line #1 to inactive state, and clear flag |

-continued

| Network Control | |
|---|---|
| CLR_NETWORK_2 | ;Set network line #2 to inactive state, and clear flag |

Credit Control

Arcade system 20 is configured to allow the play of PC-based application 64 (FIG. 2) for a fee and includes crediting device 30 (FIG. 1). Of course, it should be readily apparent that PC-based applications are not typically played for a fee. Nor are crediting devices typically a component in a conventional PC system. Accordingly, in order to adapt PC-based application 64 (FIG. 2) to an automated format in which a game is automatically initiated upon the detection of the appropriate amount of credit and continued upon the detection of additional credit, interface circuit 38 includes a credit input element 212 and a credit output element 214. Credit input element 212 and credit output element 214 are operatively coupled to processor 66 via control bus 72 and are controlled by a credit monitor segment 216 of control program 74.

Credit input 212 is configured for connection with crediting device 30 (FIG. 1) in order to detect a credit signal 218 produced by crediting device 30 when crediting device 30 receives credit, such as coins, bills, or a credit reading from magnetic card. Credit signal 218 is a switch signal having a high and a low state that indicates detection of the input of credit. Although credit input element 212 is illustrated as a separate switch input in FIG. 3, those skilled in the art will recognize that since credit signal 218 is a switch signal, it may be input into interface circuit 38 as a switch input 152 (FIG. 5) at switch input connector 150 (FIG. 5).

Regardless of how credit signal 218 is received at interface circuit 38, credit monitor segment 216 serves to allow initiation of PC-based application 64 (FIG. 2) upon detection of credit signal 218. Credit monitor segment 216 also includes a credit counter subsection 220 that increments a total credit value 222 in response to detection of credit signal 218.

Upon incrementing total credit value 222, total credit value 222 is compared with a predetermined maximum value 224 set through setup program 81 (FIG. 2) and stored in a maximum credit memory element 226. Whenever, total credit value 222 exceeds predetermined maximum value 224, credit monitor 216 of control program 74 prevents the initiation of PC-based application 64 (FIG. 2). This credit check is a fraud prevention scheme which serves to limit the total amount of credit that may be paid into or limit the number of times a particular game may be played on arcade system 20 (FIG. 20). Additional variables in credit monitor segment 216 that are set through setup program 81 include the cost to initiate PC-based application 64, the cost to continue PC-based application 64, and so forth.

Crediting device 30 also typically includes a mechanical credit counter (not shown). Credit output element 214 is configured to be in communication with the credit counter. Credit monitor segment 216 causes credit output element 214 to output a counter advance signal 228 in response to detection of credit signal 218. Counter advance signal 228 is configured to cause the credit counter of crediting device 30 to advance.

Some instructions 75 (FIG. 2) that may be used to form credit monitor segment 216 include the following:

| Game Control Functions: | |
|---|---|
| CREDITS | ;Current credit count (credit signal 218) |
| INC_GAMES_PLAYED | ;Increment total credit value 222 |
| FULL_CREDIT | ;One game credit available flag |
| CLR_FULL_CREDIT | ;Clear game credit available flag |
| MAX_CREDIT_FLAG | ;Total credit value 222 exceeds predetermined maximum value 224 |
| CLR_MAX_CREDIT_FLAG | ;Clear maximum credit flag |
| COIN_CREDIT | ;Output counter advance signal 228 |
| MAX_CREDIT | ;Predetermined maximum value variable |
| VENDING_CREDIT | ;Starting game cost variable |
| VENDING_CREDIT_CONT | ;Continue game cost variable |

ID Verification Control

The operation of interface circuit 38 is also controlled by other segments of control program 74 stored in memory 68. For example, memory 68 of interface circuit 38 includes a programmable read-only memory 230 in which an interface circuit identifier (ID) 232 is stored. ID 232 uniquely identifies interface circuit 38. Control program 74 includes a verification segment 234 having a programmed interface circuit identifier (programmed ID) 236 that is inserted into control program 74 when control program 74 is being written. When processor 66 accesses memory 68 to initiate execution of control program 74, processor 66 first performs verification segment 234 to verify a match between ID 232 and programmed ID 236. When ID 232 and programmed ID 236 match, the remainder of control program 74 is downloaded into memory 68. Accordingly, verification segment 234 provides copy protection of control program 74.

PC Reset Control

Another segment of control program 74 includes PC reset segment 238. Interface circuit includes a PC reset output 240 in communication with processor 66 via control bus 72. PC reset output 240 is an output connector configured for connection with a conventional PC reset switch 242 (FIG. 2) found on PC 40 (FIG. 2). PC reset segment 238 is invoked to initiate a hardware reset of PC 40 (FIG. 2). A hardware reset of PC 40 is desirable to recover PC 40 from a software error or glitch that causes PC 40 to freeze. In addition, a hardware reset of PC 40 is performed when first starting control program 74 in order to provide synchronization between PC 40 and interface board 38 prior to the execution of control program 74.

PC reset segment 238 provides a PC reset signal 244 to PC reset output 240 for subsequent transfer to PC reset switch 242. PC reset signal 244 is a relay signal for initiating a hardware reset of PC 40. Instructions 75 (FIG. 2) that may be used to form PC reset segment 238 include the following:

PC Function

PC_RESET ;Initiate a PC reset

Game Length Control

Control program 74, stored in memory 68, also includes a game length segment 246. Those skilled in the art realize that arcade games run for a limited amount of time. This amount of time may depend upon an elapsed game time, a number of times a particular character of the game is "killed", a fuel expenditure event, an artillery expenditure event, and so forth. Game length segment 246 of control program 74 includes a maximum application length (MAX GAME LENGTH) value 248 which is set in memory 68 through setup program 81 (FIG. 2) to limit the amount of time that PC-based application 64 may run.

In one embodiment, once PC-based application 64 (FIG. 2) is initiated, game length segment 246 monitors an elapsed game time through a counter element 250 and allows PC-based application 64 to run until a value of counter element 250 is substantially equal to maximum application length value 248. In other words, this function limits the amount of time PC-based application 64 may be played following detection of credit signal 218 based upon elapsed time.

In an alternative embodiment, game length segment 246 of control program 74 may be configured to detect or monitor a predetermined event of the PC-based application 64 during play. For example, the number of times the character in the game is "killed", a fuel expenditure signal, or an artillery expenditure signal. In such instances, preset maximum application length value 248 is set to a value appropriate to the game. Accordingly, game length segment 246 monitors for the particular event, for example the "death" of a character, and counts such an event through counter 250. PC-based application 64 is allowed to run until the value of counter element 250 is substantially equal to maximum application length value 248.

Of course, those skilled in the art will also recognize that preset maximum application length value 248 may be set to zero, the value in counter element 250 may be set to a number higher than zero, and game length segment 246 may cause counter element 250 to decrement the value of counter element 250 in order to end PC-based application when the value of counter element 250 is substantially equal to zero.

Figure 6:
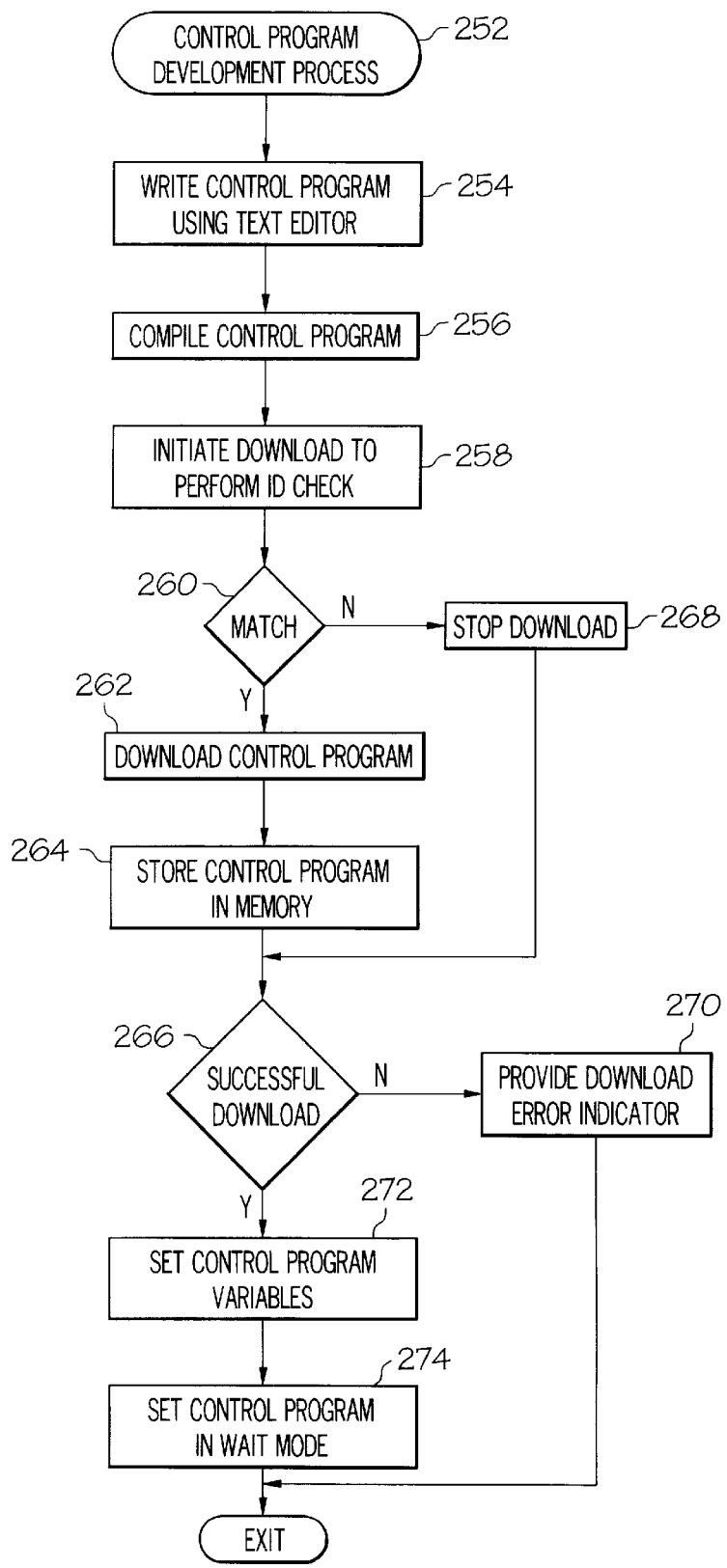
FIG. 6 shows a flow chart of a control program development process.

FIG. 6 shows a flow chart of a control program development process 252. Process 252 generally illustrates the tasks performed by a developer on a development PC (not shown) or alternatively on PC 40 to which a conventional keyboard (not shown) is connected to keyboard input 50 (FIG. 2) for creating, compiling, and invoking control program 74. Process 252 begins with a task 254. At task 254, the developer writes a text rendition of a control program, such as control program 74, using text editor 77 (FIG. 2), and entering the appropriate instructions 75 (FIG. 2) such as those listed above.

Following task 254, a task 256 is performed to invoke compiler 79 (FIG. 2) in order to compile the text rendition of instructions 75 to form control program 74. Following successful compilation of control program 74, a task 258 is performed.

When control program 74 is written and compiled on PC 40, task 258 causes PC 40 to begin downloading control program 74 into memory 68 (FIG. 3) of interface circuit 38 through serial communication port 78 (FIG. 3). Those skilled in the art will recognize that when control program 74 is developed on a development PC, a serial link must be made between the development PC and serial communication port 78 of interface circuit 38 prior to downloading task 258.

Task 258 causes verification segment 234 to be invoked so that programmed interface circuit identifier 236 may be compared with interface circuit identifier 232 stored in memory 68. In connection with task 258, a query task 260 is performed. Query task 260 causes processor 66 (FIG. 3) to determine if programmed interface circuit identifier 236 matches interface circuit identifier 232.

When programmed interface circuit identifier 236 matches interface circuit identifier 232, process 252 proceeds to a task 262. Task 262 causes the remainder of control program 74 to be downloaded into interface circuit 38 and a task 264 causes control program 74 to be stored in memory 68 per conventional processor downloading techniques known to those skilled in the art.

When query task 260 determines that there is not a match between programmed interface circuit identifier 236 and interface circuit identifier 232, program control proceeds to a task 268. Task 268 causes the download activity to be aborted so that control program 74 will not be downloaded to interface circuit 38. In response to task 268, process 252 then proceeds to query task 266. Likewise, following tasks 262 and 264, process 252 proceeds to query task 266.

Query task 266 determines if the download of control program 74 to memory 68 is successful. When download is not successful, such as when programmed interface circuit identifier 236 and interface circuit identifier 232 do not match, or if there is a hardware or software communication error between the PC and interface circuit 38, process 252 proceeds to a task 270.

Task 270 causes a download error indicator to be provided to the developer to indicate failure of the download function. Those skilled in the art will recognize that this indicator can be any of several types of messages that can be presented on the PC monitor. Alternatively, the error indicator can be in the form of an audible beep, series of beeps, audible message, or buzz. Following task 270, process 252 exits.

When query task 266 determines that control program 74 has been successfully downloaded in task 262 and stored in memory 68 in task 264, a task 272 is performed.

At task 272, interface circuit 38 is connected to PC 40 (FIG. 2) and to any of a number of peripheral devices 59 (FIG. 2), as discussed previously, and program variables that form part of control program 74 are set. Such variables include preset maximum game length variable 248 (FIG. 3), predetermined maximum value 224, cost to start the game, cost to continue the game, skill level, volume, and so forth. The variables are set by the developer during development of control program 74 and are reset or adjusted by the arcade owner in the arcade by invoking setup program 81 in PC 40.

Following task 272, a task 274 is performed. Task 274 causes control program 74 to be initiated by processor 66 of interface circuit 38. Control program 74 may be set in a wait mode, or idle mode, until PC-based application 64 is invoked. For example, PC-based application 64 may be invoked upon detection of credit signal 218 (FIG. 3). Following task 274, process 252 exits with control program 74 loaded into memory 68 and awaiting further instructions or input.

Figure 7:
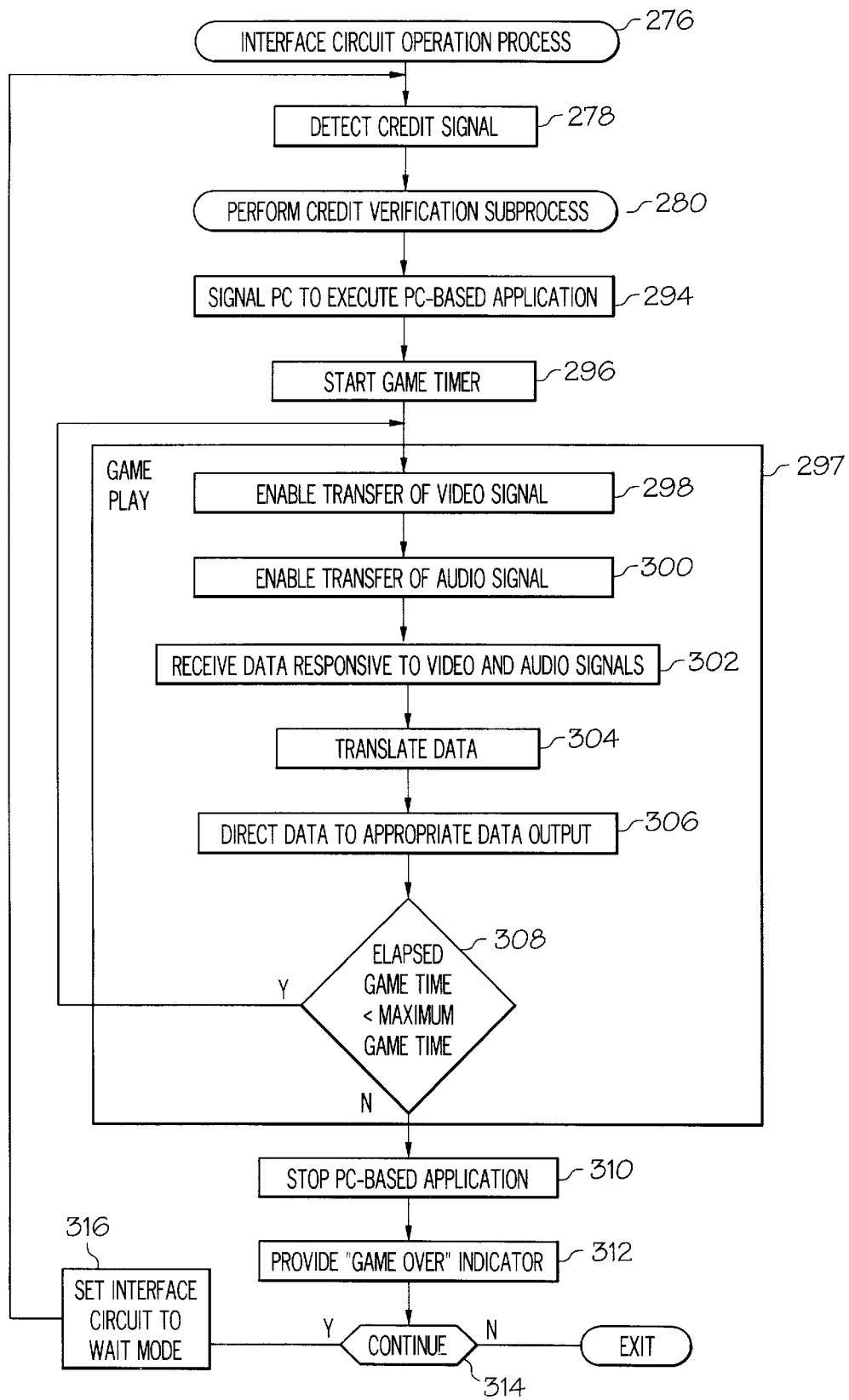
FIG. 7 shows is a flow chart of a process for operating the interface circuit.
Figure 8:
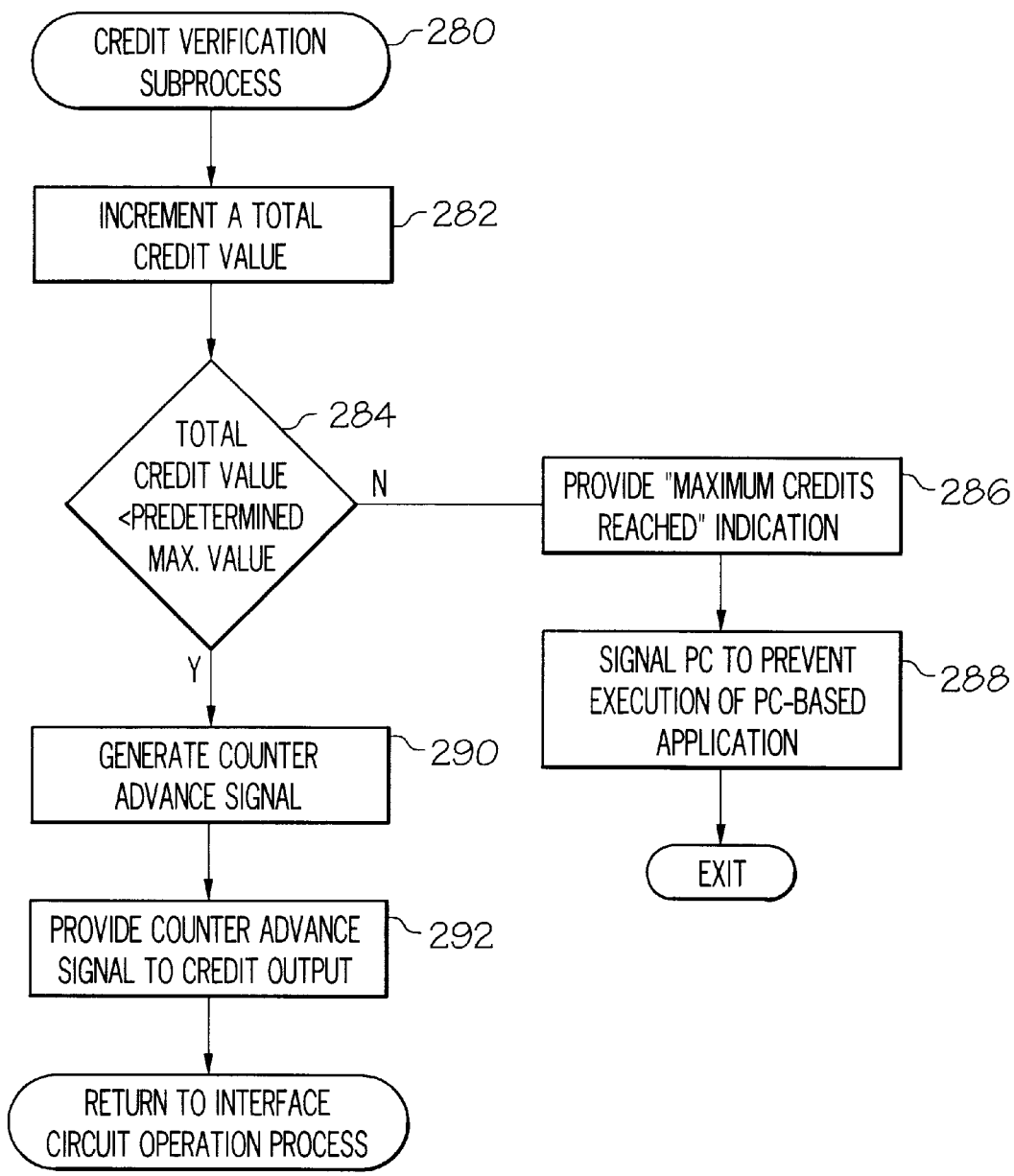
FIG. 8 shows a flow chart of a credit verification subprocess.

Referring to FIGS. 3 and 7, FIG. 7 shows is a flow chart of an exemplary process 276 for operating interface circuit 38. Process 276 generally illustrates the tasks performed in response to control program 74 stored in memory 68 of interface circuit 38. However, since control program 74 is user-configurable, the specific listing of tasks depends upon the specific instructions 75 (FIG. 2) utilized when developing control program 74 for PC-based application 64.

Exemplary process 276 begins with a task 278. Task 278 causes credit monitor segment 216 of control program 74 to detect credit signal 218 at credit input 212. Upon detection of credit signal 218 in task 278, a credit verification subprocess 280 is performed. FIG. 6 shows a flow chart of a credit verification subprocess 280.

Credit verification subprocess 280 begins with a task 282. In task 282, credit monitor segment 216 increments total credit value 222 of credit counter subsection 220. In connection with task 282, a query task 284 is performed. Query task 284 causes credit monitor segment 216 to determine if total credit value 222 is less than predetermined maximum value 224.

When query task 284 determines that total credit value 222 not less than predetermined maximum value 224, a task 286 is performed. Task 286 causes interface circuit 38 to generate a "maximum credits reached" indication. In other words, interface circuit 38 provides an indicator as an audio or video output, such as a beep or error message to indicate that PC-based application 64 has been executed a predetermined maximum number of times. Accordingly, in connection with task 286, a task 288 is performed.

In task 288, control program 74 stored in memory 68 of interface circuit 38 generates a command to stop execution of PC-based application 64. This command is sent to PC 40 to prevent PC 40 from invoking PC-based application 64. Following task 288, subprocess 280 exits.

However, in task 284, when total credit value 222 is less than predetermined maximum value 224, credit verification subprocess 280 proceeds to a task 290. In task 290, credit monitor segment 216 of control program 74 generates counter advance signal 228.

In response to task 290, a task 292 is performed. Task 292 causes credit output element 214 (FIG. 3) of interface circuit 38 to output counter advance signal 228 for subsequent communication to the mechanical counter of arcade system 20 (FIG. 2) through credit output element 214 (FIG. 3).

Following task 292, credit verification subprocess 280 is complete with the payment of credit verified. Referring to FIG. 7, following task 292 of subprocess 280, program control returns to a task 294 of interface circuit operation process 276.

In task 294, control program 74 signals PC 40 (FIG. 2) to execute PC-based application 64 (FIG. 2). Processor 66 (FIG. 3) executing control program 74 enables transfer of this signal through serial communication port 78 (FIG. 3). Alternatively, the signaling may occur through keyboard output 136 (FIG. 5) to keyboard input port 50 (FIG. 2) of PC 40. In yet another embodiment, the signaling may occur through mouse output 172 or serial output 174 to mouse port 52 (FIG. 2) of PC 40. The route through which PC 40 receives a signal to start PC-based application 64 is dependent upon the specific start application commands that are recognizable by PC-based application 64.

As discussed previously, first video signal 80 (FIG. 3) is the game video for PC-based application 64 and second video signal 82 is another video signal coming, for example, from second monitor port 49 (FIG. 2) of PC 40. Accordingly, as PC-based application 64 is being initiated, control program 74 controls the commanding to PC 40 to select PC-based application 64 from a menu and to set up specific PC-based application 64 variables. However, this activity is hidden from the user of arcade system 20 (FIG. 2) while task 294 is being performed because video control segment 92 of control program 74 enables the transfer of second video signal 90 from second video input 82 to video output 84 (FIG. 3) for subsequent presentation on monitor 34 (FIG. 2).

In connection with task 294, a task 296 is performed. Task 296 causes timer segment 246 of control program 74 to start a timing process in order to measure elapsed game time 250 (FIG. 3). Of course, those skilled in the art will recognize that not all arcade games run for a predetermined amount of time. Rather, some arcade games may be playable until a character dies a predetermined number of times, until artillery is used up, or until a count up or down of a particular variable is attained. Accordingly, for those types of arcade games, variables may be set or cleared in control program 74 in task 296 rather than starting a timing process to measure elapsed game time 250.

Following task 296, a game play activity 297 is performed. Game play activity 297 includes several tasks associated with the transfer of signals to and from the various devices connected to interface circuit 38. Referring to FIG. 2, such devices include PC 40, speakers 36, monitor 34, the peripheral devices 59 (such as first and second joysticks 24 and 26 and user-activated buttons 28), and so forth. For clarity of the following description, game play activity 297 is split into a number of discrete tasks. However, those skilled in the art will recognize that the discrete tasks are actually interrelated and depend upon the outcome of the other tasks that form game play activity 297.

Game play activity includes a task 298. Task 298 causes video control segment 92 of control program 74 to enable the transfer of first video signal 88 from first video input 80 to video output 84. In other words, task 298 causes interface circuit 38 to enable the transfer of the video signal of PC-based application from PC 40 to monitor 34 through video I/O functional element 86 (FIG. 3) of interface circuit 38.

In addition to the selective transfer of first video signal 88 in task 298, a task 300 is performed. Task 300 causes audio control segment 128 (FIG. 3) of control program 74 to enable the transfer of first audio output signal 116 (FIG. 4) through first audio output 100 and/or to enable the transfer of second audio output signal 120 through second audio output 102. As discussed previously, first audio signal 124 is the audio signal of PC-based application 64. In connection with first audio signal 124, second audio signal 126 (FIG. 4), a microphone signal, and/or audio messages 110 may be mixed in audio mixer circuit 114 to produce first and second audio output signals 116 and 120.

In connection with tasks 298 and 300, a task 302 is performed. Task 302 causes interface circuit 38 to receive data in response to the video and audio signals presented to the user of arcade system 20 (FIG. 2). As discussed previously, the data may be keystroke data, mouse data, digital switch data, and/or joystick data for which interface circuit 38 is configured to receive through any of the several inputs, such as keyboard input 134 (FIG. 5), switch input connector 150 (FIG. 5), serial input port 162 (FIG. 5), mouse input 170 (FIG. 5), and joystick input 188 (FIG. 3).

In response to task 302, a task 304 allows control program 74 stored in memory 68 of interface circuit 38 to selectively translate the received data into a format recognizable by PC-based application 64. Referring to FIG. 3, processor 66 may invoke keystroke data pass-through subsection 142, keyboard emulation subsection 148, mouse data translation subsection 166, mouse data pass-through subsection 180, mouse emulation subsection 186, joystick pass-through subsection 194, or a combination thereof to selectively translate the data to a data format recognizable by PC-based application 64.

With reference back to FIG. 7, in addition to translation task 304, a task 306 causes interface circuit, as controlled by control program 74 to direct the data to the appropriate data output. As discussed previously, the data may be directed to keyboard output 136 (FIG. 5) for subsequent receipt at keyboard port 50 (FIG. 2) of PC 40, mouse output 172 (FIG. 5) of serial output 174 for subsequent receipt at mouse port 52 (FIG. 2) of PC 40, joystick output 190 for subsequent receipt at game port 54 (FIG. 2) of PC 40, or a combination thereof to selectively direct the data to PC 40.

As a background task to video transfer task 298, audio transfer task 300, data receipt task 302, data translation task 304, and data output task 306, a query task 308 is performed. Query task 308 causes game length segment 246 (FIG. 3) of control program 74 to determine if the value of counter 250 (FIG. 3) is less than preset maximum application length 248 (FIG. 3). As described previously in connection with game length segment 246 (FIG. 3), task 308 may be monitoring an elapsed game time, a number of times a character is "killed", a fuel expenditure signal, an artillery expenditure signal, and so forth. When the value of counter 250 is less than preset maximum application length 248, then process 276 loops back to task 298. In other words, game play activity 297 continues.

When the value of counter 250 is not less than preset maximum application length 248, process 276 proceeds to a task 310. Task 310 ends game play activity 297 when processor 66, executing control program 74, signals PC 40 to stop PC-based application 64 (FIG. 2). Like task 294, signaling may occur through serial communication port 78 (FIG. 3), through keyboard output 136 (FIG. 5) to keyboard port 50 (FIG. 2) of PC 40, or through mouse output 172 or serial output 174 to mouse port 52 (FIG. 2) of PC 40. The route through which PC 40 receives a signal to end PC-based application 64 is dependent upon the specific end application commands that are recognizable by PC-based application 64.

In connection with task 310, a task 312 is performed. Task 312 causes interface circuit 38 to provide a "game over" indicator. In other words, interface circuit 38 provides an indicator, such as one of audio messages 110 (FIG. 3), to indicate that the game played by the user of arcade system 20 is over. Video control segment 92 may also cause video I/O functional element 86 to transfer second video signal 90 received at second video input 82 to video output 84 for subsequent display on monitor 34 (FIG. 2) rather than the game video which is first video signal 88.

Following task 312, a query task 314 is performed. Query task 314 determines if control program 74 is to continue executing. In other words, processor 66 determines that control program 74 includes instructions to place interface circuit 38 in a wait mode until credit signal 218 (FIG. 3) is once again detected. Alternatively, control program 74 may include instructions that prevent any further execution of PC-based application 74.

When query task 314 determines that control program 74 is to continue controlling interface circuit 38, process 276 proceeds with a task 316. Task 316 causes processor 66 to execute those instructions in control program 74 that set interface circuit 36 in a wait, or idle mode. Of course, those skilled in the art will recognize that while control program 74 is in the idle mode, processor 66 may be executing housekeeping tasks (not shown) to maintain interface circuit 38. Once control program 74 is placed in the wait mode, process 276 loops back to task 278 to detect credit signal 218 (FIG. 3) and subsequently perform game play activity 297.

However, when query task 312 determines that processor 66 (FIG. 3) is to stop the execution of control program 74 and release control of circuit board 38, process 276 exits.

In summary, the present invention teaches of an interface circuit in an arcade system and method that adapt a personal computer (PC) based application to an automated format. The interface circuit includes a user-configurable control program stored in a memory and executed by a processor both of which are resident in the interface circuit. The user-configurable control program provides features such as credit monitoring, fee prompts, audible cues, timing cues, interfacing capability with arcade controls and virtual reality devices, networking capabilities, and so forth that are typically part of an arcade application. In addition, the control program and the interconnections of interface circuit adapts the PC-based application to an automated format having arcade-style features without changing the existing PC-based application code and without installing game dedicated circuit boards into the personal computer. Furthermore, the variety of inputs and outputs on interface circuit allow the interface circuit to be selectively configured for a variety of PC-based applications and allow the interface circuit to be networked with another one or more interface circuits to provide networked play of arcade games.

Although the preferred embodiments of the invention have been illustrated and described in detail, it will be readily apparent to those skilled in the art that various modifications may be made therein without departing from the spirit of the invention or from the scope of the appended claims. For example, the control program need not be limited to the adaptation of a single PC-based application to an automated format. Rather, several PC-based applications may be executed under the direction of a single control program. In addition, the input and output connectors and input and output signals may be configured differently than those that were described. However, the connectors need be configured for communication with the input ports found on a conventional personal computer and the signals need be in a data format that is recognizable by the PC-based application.

What is claimed is:

1. In an arcade system, an interface circuit for adapting a PC-based application to an automated format, said arcade system having a personal computer (PC), a display unit, and a peripheral device, said PC-based application being installed on said PC and being executable from said PC, said interface circuit comprising:

a communication port being configured for electrical communication with a serial port of said PC;

a data input being configured for electrical communication with said peripheral device for receiving data from said peripheral device;

a data output being configured for electrical communication with said PC for providing said data to said PC;

a video input being configured for electrical communication with said PC for receiving a video signal of said PC-based application;

a video output being configured for electrical communication with said display unit for providing said video signal of said PC-based application to said display unit;

a processor in communication with each of said data input, said data output, said video input, and said video output; and a memory coupled to said processor, said memory having stored therein a user-configurable control program executable on said processor, and said control program including:

a data control segment that selectively translates said data to a data format recognizable by said PC-based application and selectively enables the transfer of said data from said data input to said data output; and a video control segment that selectively transfers said video signal from said video input to said video output.

2. An interface circuit as claimed in claim 1 wherein:

said communication port is operatively coupled to said memory for receiving said control program from said PC and transferring said control program into said memory; and said interface circuit further comprises a programmable read-only memory coupled to said processor and having stored therein an interface circuit identifier which uniquely identifies said interface circuit, and said control program further includes:

a verification segment having a programmed interface circuit identifier, such that said verification segment verifies a match between said interface circuit identifier and said programmed interface circuit identifier prior to the transfer of said video control segment and said data control segment to said memory.

3. An interface circuit as claimed in claim 1 wherein:

said interface circuit further comprises a PC reset output configured for connection with a PC reset switch of said PC, and said PC reset output being in communication with said processor; and said control program further includes a PC reset segment that provides a PC reset signal for initiating a hardware reset of said PC.

4. An interface circuit as claimed in claim 1 wherein said peripheral device is a mouse, said data is mouse movement data, and:

said data input is a mouse input;

said data output is a mouse output configured for connection with a mouse input port of said PC; and said data control segment allows the transfer of said mouse movement data from said mouse to said mouse input port of said PC.

5. An interface circuit as claimed in claim 1 wherein:

said data output is a serial communication output configured for connection with a mouse input port of said PC; and said data control segment includes a mouse emulation segment that provides mouse movement data recognizable by said PC-based application.

6. An interface circuit as claimed in claim 1 wherein said input device is a mouse, said data is mouse movement data, and:

said input is a serial communication input configured for connection with said mouse; and said data control segment includes a mouse translation segment that translates said mouse movement data received at said serial communication input into said data format recognizable by said PC-based application.

7. An interface circuit as claimed in claim 1 wherein said data is keystroke data, and:

said data input is a keyboard input;

said data output is a keyboard output configured for connection with a keyboard input port of said PC; and said data control segment allows the transfer of said keystroke data from said peripheral device to said keyboard input port of said PC.

8. An interface circuit as claimed in claim 1 wherein:

said data output is a keyboard output configured for connection with a keyboard input port of said PC; and said data control segment includes a keyboard emulation segment that provides keystroke data recognizable by said PC-based application.

9. An interface circuit as claimed in claim 1 wherein said input device is a switch, said data represents one of a first switch position and a second switch position, and:

said data input is a switch input; and said data control segment sets a flag in response to receipt of said data representing said first switch position at said switch input.

10. An interface circuit as claimed in claim 1 wherein:

said data output is configured for connection with a game port of said PC; and said data control segment allows the transfer of said data produced by said peripheral device to said game port of said PC.

11. An interface circuit as claimed in claim 10 further comprising:

means for providing a predetermined signal; and a switching element in communication with said data input, said data output, and said providing means, wherein said data control segment includes a switching segment that controls said switching element to allow said predetermined signal to supersede said data at said data output, said predetermined signal causes said PC-based application to presume that there is an absence of said data produced by said peripheral device.

12. An interface circuit as claimed in claim 1 wherein said arcade system includes an audio output device, and said interface circuit further comprises:

an audio input configured to receive an audio output signal of said PC-based application from a line out port of said PC;

an audio recorder configured to provide pre-recorded audio messages stored in a memory portion of said audio recorder;

an audio output operatively coupled to each of said audio input and a recorder output of said audio recorder element, and configured for connection with said audio output device; and said control program further includes an audio control segment that provides said audio output signal and said pre-recorded audio messages to said audio output device at a preset volume.

13. An interface circuit as claimed in claim 1 further comprising a power input configured for connection with a power supply of said PC.

14. An interface circuit as claimed in claim 1 wherein said video input is a first video input, said video signal is a first video signal, and:

said interface circuit further comprises a second video input in communication with said processor and configured to receive a second video signal; and said video control segment selectively routes one of said first and second video signals to said video output.

15. An interface circuit as claimed in claim 1 further comprising:

a first network signal link;

a second network signal link, said first and second network signal links being configured for connection to a second interface circuit operable in a second arcade system; and said control program further includes a network segment that sets a first bidirectional signal carried on said first network signal link and a second bidirectional signal carried on said second signal link to allow networked communication between said interface circuit and said second interface circuit.

16. An interface circuit as claimed in claim 1 wherein said arcade system includes a crediting device, said crediting device producing a credit signal in response to an amount of credit paid into said crediting device, and:

said interface circuit further comprises a credit input configured for connection with said crediting device for receiving said credit signal; and said control program further includes a credit monitor segment that detects said credit signal and allows initiation of said PC-based application upon detection of said credit signal.

17. An interface circuit as claimed in claim 16 wherein said credit monitor segment includes:

a credit counter element that increments a total credit value in response to detection of said credit signal; and a maximum credit memory element having a predetermined maximum credit value stored therein, wherein said credit monitor segment prevents initiation of said PC-based application when said total credit value exceeds said predetermined maximum value.

18. An interface circuit as claimed in claim 16 wherein said crediting device includes a credit counter, and said interface circuit further comprises a credit output configured to be in communication with said credit counter and operatively coupled to said processor, and said credit monitor segment provides a counter advance signal to said credit output in response to detection of said credit signal, said counter advance signal being configured to cause said credit counter to advance.

19. An interface circuit as claimed in claim 1 wherein:

said memory includes a game length memory section having a preset maximum application length value stored therein, said preset maximum application length value being configured to limit a duration during which said PC-based application may be executed; and said control program includes an application length segment having a counter portion that counts a value, wherein:

when said value is less than said preset maximum application length value, said PC-based application is executed by said PC; and when said value is substantially equal to said preset maximum application length value, said PC ceases execution of said PC-based application.

20. A method of operating an interface circuit to adapt a personal computer-based (PC-based) application to an automated format in an arcade system having a PC, a crediting device, a display unit, an audio output device, and an input device, wherein said interface circuit is coupled between said PC and each of said input device, said crediting device, said display unit, and said audio output device, said method comprising the steps of:

a) detecting at said interface circuit a credit signal produced by said crediting device in response to an amount of credit paid into said crediting device;

b) signaling said PC to execute said PC-based application in response to said detected credit signal;

c) transferring a video signal of said PC-based application from said PC to said display unit;

d) transferring an audio output of said PC-based application from said PC to said audio output device;

e) receiving data from said input device, said data being responsive to said PC-based application;

f) translating said data, said translated data being recognizable by said PC-based application; and g) selectively directing said translated data to said PC.

21. A method as claimed in claim 20 further comprising the steps of:

measuring an application length value in response to said step b);

repeating said steps c)–g) when said application length value is less than a maximum application length value stored in a memory element of said interface, said maximum application length value being configured to limit a duration during which said PC-based application may be executed; and signaling said PC to cease execution of said PC-based application when said application length value is substantially equal to said maximum application length value.

22. A method as claimed in claim 20 wherein said step a) comprises the steps of:

incrementing a total credit value in response to said credit signal;

comparing said total credit value to a predetermined maximum value; and preventing execution of said PC-based application when said total credit value exceeds said predetermined maximum value.

23. A method as claimed in claim 20 further comprising the steps of:

generating, in said interface circuit, data recognizable by said PC-based application; and directing said data to said PC in cooperation with said PC-based application.

24. In an arcade system, an interface circuit for adapting a PC-based application to an automated format, said arcade system having a personal computer (PC), a crediting device, a peripheral device, and an audio output device, said PC-based application being installed on said PC and being executable from said PC, said crediting device producing a credit signal in response to an amount of credit paid into said crediting device, and said interface circuit comprising:

a credit input being configured for connection with said crediting device for receiving said credit signal;

an audio mixer system having an audio input, an audio recorder, and an audio output, said audio input being configured for electrical communication with said PC to receive an audio output signal of said PC-based application, said audio recorder having a plurality of pre-recorded audio messages recorded therein, and said audio output being operatively coupled to each of said input and said audio recorder, and said audio output being configured for connection with said audio output device;

a data input being configured for electrical communication with said peripheral device for receiving data from said peripheral device;

a data output being configured for electrical communication with said PC for providing said data to said PC;

a processor in communication with each of said credit input, said audio input and output, and said data input and output; and a memory coupled to said processor, said memory having stored therein a user-configurable control program executable on said processor, and said control program including:

a credit monitor segment that detects said credit signal and allows initiation of said PC-based application upon detection of said credit signal;

an audio control segment that provides said audio output signal and said pre-recorded audio messages to said audio output at a pre-set volume; and a data control segment that selectively translates said data to a data format recognizable by said PC-based application and selectively enables the transfer of said data from said data input to said data output.

* * * * *

UNITED STATES PATENT AND TRADEMARK OFFICE
CERTIFICATE OF CORRECTION

| | |
|---|---|
| PATENT NO. | : 6,374,208 B1 |
| DATED | : April 16, 2002 |
| INVENTOR(S) | : Robert D. Ferris and Roger D. Malin |

It is certified that error appears in the above-identified patent and that said Letters Patent is hereby corrected as shown below:

<u>Column 3,</u>
Line 20, please delete "are –mounted" and insert -- are mounted -- therefor.

Signed and Sealed this

Sixth Day of August, 2002

*Attest:*

*Attesting Officer*

JAMES E. ROGAN
*Director of the United States Patent and Trademark Office*